Patented Mar. 29, 1949

2,465,513

UNITED STATES PATENT OFFICE 2,465,513

POLYSULFIDE COATING AND SEALING MATERIAL

Frederic M. Carasso, Pasadena, Calif., assignor to Lockheed Aircraft Corporation, Burbank, Calif.

No Drawing. Application November 9, 1945, Serial No. 627,799

17 Claims. (Cl. 260—29.2)

This invention relates to coating, sealing and filleting materials, and relates more particularly to compositions of this character compounded from organic polysulfide polymers resulting from the interaction of alkaline sulfides and chlorinated compounds.

In my copending application, Serial No. 623,868, filed October 22, 1945, I have disclosed a sealing material useful in situations where adherent coatings or masses of rubber-like material are required. An example of the numerous applications of such sealing material is the sealing of the seams, rivets, etc., of the so-called integral fuel and lubricant tanks incorporated in the wings and fuselages of airplanes. In such cases it is essential that the sealing material retain its elasticity and adherence in the presence of aromatic fuels, oil and water throughout a wide range of temperatures. Furthermore, the sealing material must be such that it does not sag or flow due to excessive softness or crack because of excessive hardness. The sealing composition disclosed in my above referred to application is commounded of a major proportion of an aqueous dispersion of organic polysulfide polymers resulting from the interaction of alkaline polysulfides and chlorinated organic compounds, a coalescing agent for the dispersion, and where necessary, a corrosion inhibitor.

It is a general object of this invention to provide an improved coating, sealing and filleting material of the character above referred to.

It is another object of the invention to provide a sealing material of the class referred to incorporating a resinous additive which serves to materially improve the water resistance and to greatly improve the adhesion of the material to aluminum, etc. Furthermore, the product of this invention has a better retention of the adhesion, and it has been found that coatings and bodies of the present sealing material retain complete effective adhesion under shear and tension stresses while in the presence of aromatic fuel, oils and water.

Another object of the invention is to provide a sealing, coating and filleting material of the class above mentioned in which the resinous additive increases the resistance to oxidation. I have found that the quality of cured coatings of the material is actually benefited when the coatings are exposed to conditions favoring oxidation.

A further object of the invention is to provide a sealing and coating material in which the rates of coalescence and curing are considerably accelerated, and the tendency of the coatings and applied bodies to cold flow at elevated temperatures is markedly reduced.

The sealing, coating and filleting material of the present invention is capable of substantial variation, and the relative proportions of its constituents may be materially modified to suit it for different applications. Accordingly, the details and examples set forth herein are not to be constituted as limiting the invention.

The composition of matter provided by the invention may be said to comprise generally an aqueous dispersion of polymeric organic polysulfides, a coalescing agent, a corrosion inhibitor, where required, and a resinous additive.

The base or principal ingredient of the composition is an aqueous dispersion of an organic polysulfide polymer resulting from the interaction of alkaline polysulfides and chlorinated organic compounds, or a mixture of two or more such polymers. United States Letters Patent, Nos. 1,890,191 and 2,216,044 disclose polymers of the general class herein referred to, and such polymers are known to the trade as Thiokols. The Thiokols designated by their manufacturer as Thiokol MF, Thiokol WD2 and Thiokol MX, or a blend of the same, may be employed in compounding the sealing material. The Thiokol MF latex is an aqueous dispersion of a copolymer of polyethyleneformal polysulfide and a polyolefin polysulfide, the WD2 latex is an aqueous dispersion of a polyethylene-formal polysulfide and the MX latex is an aqueous dispersion of a polyolefin polysulfide. While I have referred to specific organic polysulfide polymers, it is to be understood that the invention contemplates the employment of similar or equivalent organic polysulfide polymers. As will be later described, the proportion of the solids of the aqueous dispersion is varied in different applications of the invention, and the polymers may be supplied for processing either in the form of a "cake" or a relatively thin dispersion.

The coalescing agents contemplated by the invention are dithiocarbamate compounds derived from an amino nitrogen compound containing at least two hydrogen atoms directly attached to nitrogen. The chemical structure of the coalescing agents corresponds essentially to the formula

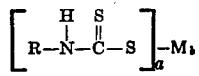

Where "R" may be hydrogen or an organic radicle; "M" may be an organic amine radicle, ammonium, or a metallic radicle; and in certain cases, (if the respective dithiocarbamic acid may exist temporarily) "M" may represent hydrogen, and where $a$ and $b$ are simple whole numbers. In most instances $a=b=1$.

Best results are obtained from the addition product of two moles of a primary mono-amine for each mole of carbon disulfide. Here the product may be represented by Formula No. 2:

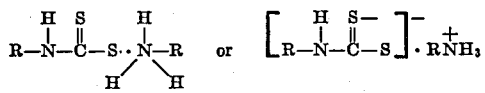

In Formula No. 2, "M" is replaced by the same amine as employed in forming the dithiocarbamate radicle. Coalescing agents of this class may be readily and conveniently prepared by methods well known to those skilled in the art.

Metallic derivatives such as Na or Zn, of monosubstituted dithiocarbamic acids may be employed as coalescing agents for the Thiokol dispersions, but have been found to be less effective than the corresponding amine or ammonium salts. Various types of amines are more or less effective as coalescing agents for alcoholic dispersions of polymeric organic polysulfides as well as for aqueous dispersions of the polymeric organic polysulfides, but coatings and sealing masses embodying such preparations as coalescing agents are relatively non-adherent. Tough coherent sheets of polysulfide rubber may be produced by the action of certain amines, and secondary as well as primary amines may be used for this purpose. However, the performance of these amines alone is definitely inferior to the results obtainable by the use of dithiocarbamic salts derived from primary amines.

The use of dithiocarbamate salts in which "M," of Formula No. 1, is an alkaline nitrogen-containing radicle comprising an amine different from that from which the dithiocarbamate radicle is derived, is contemplated by the invention. However, it has been found that entirely satisfactory results are obtainable by the use of dithiocarbamate salts in which "M," of Formula No. 1, comprises the same amine as employed in forming the dithiocarbamate radicle. Blends or mixtures of two or more of the dithiocarbamates may be employed, but it has been found more desirable to use a single dithiocarbamate compound. The use of a free amine in addition to the dithiocarbamate compound, is also within the scope of the invention, but in most instances it is preferred to use the dithiocarbamate salt without an additional free amine.

The use of dithiocarbamate compounds derived from poly amines containing at least one primary amino group (or more generally, alkaline nitrogen compounds which contain two or more nitrogen atoms, one of which has two hydrogen atoms directly attached thereto) is also contemplated by the invention, but I prefer to use the addition product of two moles of a primary mono amine for each mole of carbon disulfide.

The following examples illustrate compounds that may be used in preparing the dithiocarbamates, it being understood that the invention is not to be construed as limited to these particular examples:

Ammonia
Mono methylamine
Mono ethylamine
Mono-n-propylamine
Mono-iso-propylamine
Mono-n-butylamine
Mono-iso-butylamine
Mono-sec.-butylamine
Mono-amylamine (commercial product, mixed isomers)
Mono-n-heptylamine
Mono-n-octylamine
Mono 2-ethylhexylamine
Mono-n-dodecylamine
Mono ethanolamine
Mono benzylamine
Ethylene diamine
Hexamethylene diamine
1,3 diamino-butane
1,3 diamino-propane
Mono allylamine
Mono methallyl amine
Mono cyclohexyl amine
Mono 3-methoxyethyl amine Dithiocarbamate salts prepared from aromatic amines may also be employed as coalescing agents. In such instances it is usual to employ amines which have ionization constants in the neighborhood of $10^{-5}$ or stronger, together with the aromatic amine to insure the formation of the dithiocarbamate salt. In such instances it is essential that "M" of the above Formula No. 1 be sufficiently alkaline to assure formation of a dithiocarbamate salt. The following are typical examples of dithiocarbamate salts prepared from aromatic amines, which were isolated as the salts of ammonium hydroxide:

Ammonium phenyl dithiocarbamate
Ammonium p-tolyl dithiocarbamate
Ammonium alpha-naphthyl dithiocarbamate Dithiocarbamate salts derived from primary mono-amines, other than aromatic amines, are particularly effective as coalescing agents for the aqueous Thiokol dispersions. These include dithiocarbamate salts derived from the following types of amines:

1. Simple or unsubstituted aliphatic amines.
   (a) Saturated—e. g., mono n-butylamine.
   (b) Unsaturated—e. g., mono allylamine.
2. Substituted aliphatic amines; for example, those containing an ether linkage, e. g., 2-methoxyethylamine.
3. Alicyclic amines, e. g., cyclohexylamine.
4. Aryl alkylamine-amines in which the amino group is attached to an aliphatic substituent on an aromatic nucleus, e. g., benzylamine.

It is usually preferred to employ mono-n-butylammonium mono-n-butyl dithiocarbamate or mono-allylammonium mono-allyl dithiocarbamate as the coalescing agent for the Thiokol dispersion. These are the products derived from two moles of the respective amine per mole of carbon disulfide.

The coalescing agents of the invention are not restricted for use with any particular aqueous dispersion of polymeric organic polysulfides of any given composition, and the coalescing agents have been found to be effective with each of the three synthetic latices now commercially available, namely, Thiokol MF, Thiokol WD2 and Thiokol MX. The coalescing agents may be used to advantage with any blend or mixture of two or more of the Thiokol latices, although the properties of the resultant product are dependent to a large degree upon the nature of the latex dispersion from which it is derived and upon the quantity and character of the coalescing agent or agents.

In most embodiments of the invention, relatively small proportions of the coalescing agent are used, it being understood that the proportions of the coalescing agent may be varied within a rather wide range. Ordinarily, from approximately 0.2% to approximately 10% of the selected coalescing agent may be used, but I usually prefer to employ from approximately 0.25% to approximately 2% of the coalescing agent. The percentages here are in relation to the Thiokol latex solids of the compounds. It is usually preferred to employ from approximately 0.25% to approximately 2% of the coalescing agent with respect to the solids content of the polymeric dispersion.

Where the conditions of intended use require, an altered, "compounded" or modified product may be prepared by incorporating the coalescing agent of the invention in the Thiokol dispersion in the presence of other ingredients or during subsequent treatment of the dispersion. It is important, however, that such added ingredients or subsequent treatment of the dispersion should not adversely affect the function or purpose of either the coalescing agent or the latex. In other words, any alteration, modification or compounding should be limited to materials and procedures compatible with the coalescing agent and the polymeric organic polysulfide aqueous dispersion. The following are typical examples of materials which may be added to or incorporated in the sealing and coating material:

(a) Inert fillers such as asbestos fibre, viscose rayon fibre, cotton flock, etc.
(b) Reinforcing pigments and compounding ingredients such as zinc oxide, sulphur, zinc oxide and sulphur, walnut shell flour, zinc sulfide, titanium dioxide, etc.
(c) Materials which tend to mask or obviate objectionable odors.
(d) Liquids which a swelling, softening, plasticizing or solvent effect, or which may serve as a carrier for the coalescing agent or other added materials. In this class are certain ketones, chlorinated compounds, etc.
(e) Synthetic resins, monomers and elastomers.
(f) Corrosion inhibitors for the purpose of controlling, suppressing or inhibiting reaction of an alkaline aqueous dispersion with a corrosion susceptible material such as aluminum.
(g) Other additives whose use advantageously affects certain properties of the product for a given use.

The synthetic latices commercially available at the present time have a substantial alkaline reaction and their alkalinity is sufficient to cause appreciable reaction with alkali-sensitive materials such as aluminum. The reaction is often accompanied by gas evolution. This may result in a discontinuous sealing coat or mass and may adversely affect adhesion of the sealing material to the surface when the sealing material is applied to an alkali-sensitive surface under conditions which permit or favor such reaction. Where the sealing material is to be used on such surfaces and under such conditions it may be desirable to include in the composition one or more substances for inhibiting, suppressing or controlling the reaction. Compounds suitable for use as corrosion inhibitors, in the composition of the invention, fall into two main classes.

1. Certain compounds comprising elements in groups III to VI, inclusive, of the periodic table, which elements are at the higher valences or states of oxidation. Examples of this class of inhibitors are: vanadium pentoxide, vanadium trioxide, ammonium vanadate, ammonium sulfate, sodium metaphosphate, ammonium carbonate, ammonium carbamate, ammonium bicarbonate, ammonium molybdate, chromium vanadate, magnesium vanadate, boric acid and ammonium borate.

2. Certain organic acids or their derivatives. Examples of this class are: salicylic acid, diammonium sebacate, diammonium salt of itaconic acid and diammonium fumarate.

Excellent results are obtained by the use of vanadium pentoxide and/or compounds related to, derived from or equivalent to vanadium pentoxide. I have found vanadium pentoxide, ammonium vanadate and ammonium metavanadate to be effective as corrosion inhibitors. Salicylic acid has also given good results. Other suitable inhibitors may be used, but it is important that they should not in any way interfere with the action of the coalescing agent or have harmful effects upon the latex. It is to be understood that the invention is not to be considered as restricted to the use of a corrosion inhibitor or to the use of an aqueous Thiokol dispersion having an appreciable alkalinity.

The resinous additive of the composition is a feature of the invention. The additive is prepared by heating a suitable compound comprising an organic compound having alkenyl unsaturation with sulphur. I have found that in order to achieve the desired degree of water resistance in the sealing composition it is desirable that the organic compound be relatively non-polar and contain a relatively low proportion of hydrophilic groups or linkages. It is also preferred to use an organic compound having relatively low volatility to simplify the production of the additive. The organic compound reacts readily with sulphur at elevated temperatures and at normal atmospheric pressures. Accordingly, the additive may be prepared in an open vessel when organic compounds of the class just referred to are employed. In contradistinction, compounds which do not contain an unsaturated alkenyl radicle would not react readily with sulphur under the above described conditions. The relative proportions of the sulphur and the organic compound may be varied considerably. For example, from two to twelve gram atoms of sulphur may be employed for each gram molecular weight of the organic compound. The following examples are illustrative of the organic compounds that may be employed in preparing the resinous additive:

Styrene.
Oleyl alcohol.
2-vinyl pyridine.
Cardanol No. 923—a phenolic compound obtained by the distillation of raw cashew nut shell liquid comprising essentially 3-pentadecenyl phenol.
Cardanol No. 5923—a phenolic compound obtained by the distillation of raw cashew nut shell liquid and comprising essentially 3-pentadecadienyl phenol.
Raw linseed oil.
Maleic anhydride.

From these examples it will be seen that a wide diversity of unsaturated organic compounds may be employed in preparing the resinous additive. The organic compounds enumerated need not be in the pure state. For example, raw cashew nut shell liquid may be employed instead of the Cardanol No. 923 or No. 5923.

The resinous additive is readily prepared by heating the reactants together while agitating or stirring the same. Satisfactory results are obtained when the reaction is carried on at about 160° centigrade.

The following are general examples of resinous additives of the invention:

(a) From approximately 3 to 8 gram atoms of sulphur for each molecular weight of Cardanol No. 923. 6 gram atoms of sulphur for each molecular weight of Cardanol No. 923 is a preferred proportion.
(b) From approximately 4 to approximately 12 gram atoms of sulphur for each molecular weight of Cardanol No. 5923. From 6 to 8 gram atoms of sulphur for each molecular weight of Cardanol No. 5923 is a preferred proportion.
(c) From approximately 3 to approximately 6 gram atoms of sulphur for each molecular weight of 2-vinyl-pyridine.
(d) From approximately 3 to approximately 6 gram atoms of sulphur for each molecular weight of oleyl alcohol.

The following are typical specific examples of the resinous additives:

(e) 6 gram atomic weights of sulphur per gram molecular weight of Cardanol No. 923
    302 grams Cardanol No. 923
    192 grams sulphur
(f) 6 gram atomic weights of sulphur per gram molecular weight of Cardanol No. 5923
    300 grams Cardanol No. 5923
    192 grams sulphur
(g) 8 gram atomic weights of sulphur per gram molecular weight of Cardanol No. 5923
    300 grams Cardanol No. 5923
    256 grams sulphur
(h) 2 gram atomic weights of sulphur per gram molecular weight of 2-vinyl-pyridine
    105 grams 2-vinyl-pyridine
    64 grams sulphur
(i) 4 gram atomic weights of sulphur per gram molecular weight of oleyl alcohol
    268 grams oleyl alcohol
    128 grams sulphur In each case, the reactants are maintained at a temperature of from 160° centigrade to 170° centigrade for about four hours. The additive prepared in this manner is sufficiently fluid to be readily incorporated with the other ingredients of the sealing composition at the time of mixing the same.

The invention contemplates the employment of additional ingredients in the resinous additive which react either with the sulphur or the organic compound. For example, effective additives for the sealing composition have been prepared in which the following materials have been incorporated:

1. Various aldehydes and their derivatives—formaldehyde, paraformaldehyde, butyraldehyde, furfural, hexaldehyde, hexamethylenetetra amine
2. Rosin.

The proportion of the resinous additive employed in the sealing compound is capable of substantial variation. Best results have been obtained by using from approximately 0.5 part to approximately 3 parts of the additive per 100 parts of the aqueous polymeric polysulfide dispersion containing from 65% to 80% solids. The following are typical examples of the sealing composition of the invention.

*Example 1*

| | Parts |
|---|---|
| Thiokol WD2 cake—approximately 65% to 80% solids | 66.7 |
| Thiokol MF cake—approximately 65% to 80% solids | 33.3 |
| Coalescing agent—mono-allyl ammonium mono-allyl dithiocarbamate | 0.9 |
| Corrosion inhibitor—vanadium pentoxide | 0.3 |
| Additive—6 gram atoms of sulphur per molecular weight of Cardanol No. 923 | 1.5 |

*Example 2*

| | Parts |
|---|---|
| Thiokol WD2 cake—approximately 65% to 80% solids | 66.7 |
| Thiokol MF cake—approximately 65% to 80% solids | 33.3 |
| Coalescing agent—mono-n-butylammonium mono-n-butyl dithiocarbamate | 1.10 |
| Corrosion inhibitor—vanadium pentoxide | 0.3 |
| Additive—2 gram atoms of sulphur per molecular weight of 2-vinyl pyridine | 1.5 |

In preparing the sealing material, the several ingredients are thoroughly mixed together and heated for about one hour at approximately 180° Fahrenheit while frequently stirring or agitating the batch. It is preferred that this operation be carried on in a closed dough mixer, or the like, where there is a substantial absence of air.

The sealing material of the invention incorporating the resinous additive has improved water resistance and adhesion characteristics. Furthermore, the curing rate of the composition is materially accelerated. The cured material retains an excellent solvent resistance over a wide temperature range, and the resistance to high temperatures is unaffected by the inclusion of the resinous additive. Coatings, fillets, etc., of the material rapidly cure at room temperatures, and there is no necessity for employing heat to aid the curing. The cured coatings have a wider tolerance to the top coating materials, which generally embody the usual Thiokol swelling agents or solvents. The action of such agents on the cured putty or coating, results in a uniform but temporarily softening without affecting the adhesion of the coatings or putty bodies. The characteristics or properties of the composition will suit it for the sealing of integral fuel and oil tanks of aircraft where water resistance, full maintained adherence, and uniform curing are essential attributes.

It is to be understood that the invention is not to be taken as limited to the express procedure or examples herein set forth, these details being given only by way of illustration. I do not regard such specific details as essential to the invention except insofar as they are expressed by way of limitation in the appended claims in which it is my intention to claim the invention as broadly as permissible in view of the prior art.

I claim:

1. A composition of the class described comprising a major proportion of an aqueous dispersion of a polysulfide which is a polymer of the unit

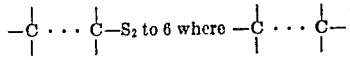

represents two carbon atoms joined to and separated by intervening structure, a small percentage of an aliphatic mono amine salt of a mono aliphatic substituted dithiocarbamic acid, and a small percentage of the heat reaction product of from 2 to 12 gram atoms of sulfur for each gram molecule weight of an organic compound having alkenyl unsaturation chosen from the group consisting of:

styrene
oleyl alcohol
2-vinyl pyridene
raw cashew nut shell distillation product comprising essentially 3-pentadecenyl phenol
raw cashew nut shell distillation product comprising essentially 3-pentadecadienyl phenol
raw linseed oil
maleic anhydride.

2. A composition of the class described comprising a major proportion of an aqueous dispersion of a polysulfide which is a polymer of the unit

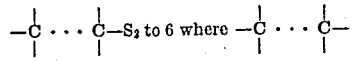

represents two carbon atoms joined to and separated by intervening structure, a small percentage of mono aliphatic ammonium mono aliphatic dithiocarbamate serving as a coalescing agent, and a small percentage of the heat reaction product of from 2 to 12 gram atoms of sulfur for each gram molecular weight of an organic compound having alkenyl unsaturation chosen from the group consisting of:

styrene
oleyl alcohol
2-vinyl pyridene
raw cashew nut shell distillation product comprising essentially 3-pentadecenyl phenol
raw cashew nut shell distillation product comprising essentially 3-pentadecadienyl phenol
raw linseed oil
maleic anhydride.

3. A composition of the class described comprising a major proportion of an aqueous dispersion of a polysulfide which is a polymer of the unit

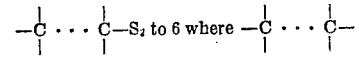

represents two carbon atoms joined to and separated by intervening structure, said dispersion containing from approximately 65% to approximately 80% solids, from approximately 0.25% to approximately 10% in relation to the solids content of said dispersion of mono aliphatic ammonium mono aliphatic dithiocarbamate serving as a coalescing agent, and from approximately 0.5 part to approximately 3.0 parts for each 100 parts of said aqueous dispersion of the heat reaction product of from 2 to 12 gram atoms of sulfur for each gram molecular weight of an organic compound having alkenyl unsaturation and chosen from the group consisting of:

styrene
oleyl alcohol
2-vinyl pyridene
raw cashew nut shell distillation product comprising essentially 3-pentadecenyl phenol
raw cashew nut shell distillation product comprising essentially 3-pentadecadienyl phenol
raw linseed oil
maleic anhydride.

4. A composition of the class described comprising a major proportion of an aqueous dispersion of a polysulfide which is a polymer of the unit

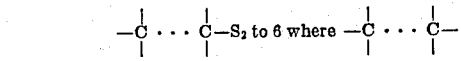

represents two carbon atoms joined to and separated by intervening structure, said dispersion containing from approximately 65% to approximately 80% solids, from approximately 0.25% to approximately 10% in relation to the solids content of said dispersion of mono aliphatic ammonium mono aliphatic dithiocarbamate serving as a coalescing agent, and from approximately 0.5 part to approximately 3.0 parts for each 100 parts of said aqueous dispersion of the heat reaction product of approximately six atomic weights of sulfur for each gram molecular weight of distilled cashew nut shell liquid.

5. A composition of the class described comprising a major proportion of an aqueous dispersion of a polysulfide which is a polymer of the unit

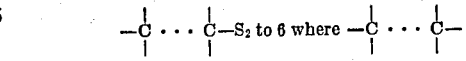

represents two carbon atoms joined to and separated by intervening structure, said dispersion containing from approximately 65% to approximately 80% solids, from approximately 0.25% to approximately 10% in relation to the solids content of said dispersion of mono aliphatic ammonium mono aliphatic dithiocarbamate serving as a coalescing agent, and from approximately 0.5 part to approximately 3.0 parts for each 100 parts of said aqueous dispersion of the heat reaction product of from approximately 4 to approximately 12 gram atoms of sulfur for each molecular weight of distilled cashew nut shell liquid.

6. A composition of the class described comprising a major proportion of an aqueous dispersion of a polysulfide which is a polymer of the unit

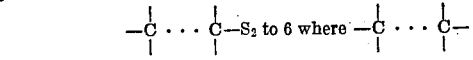

represents two carbon atoms joined to and separated by intervening structure, said dispersion containing from approximately 65% to approximately 80% solids, from approximately 0.25% to approximately 10% in relation to the solids content of said dispersion of mono aliphatic ammonium mono aliphatic dithiocarbamate serving as a coalescing agent, and from approximately 0.5 part to approximately 3.0 parts for each 100 parts of said aqueous dispersion of the heat reaction product of from approximately three to approximately eight gram atomic weights of sulfur for each gram molecular weight of an organic compound having alkenyl unsaturation and chosen from the group consisting of:

styrene
oleyl alcohol
2-vinyl alcohol
raw cashew nut shell distillation product comprising essentially 3-pentadecenyl phenol
raw cashew nut shell distillation product comprising essentially 3-pentadecadienyl phenol
raw linseed oil
maleic anhydride.

7. A composition of the class described comprising a major proportion of an aqueous dispersion of a polysulfide which is a polymer of the unit

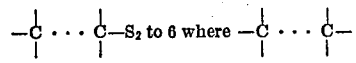

represents two carbon atoms joined to and separated by intervening structure, said dispersion containing from approximately 65% to approximately 80% solids, from approximately 0.25% to approximately 10% in relation to the solids content of said dispersion of mono aliphatic ammonium mono aliphatic dithiocarbamate serving as a coalescing agent, and from approximately 0.5 part to approximately 3.0 parts for each 100 parts of said aqueous dispersion of the heat reaction product of from approximately four to approximately twelve gram atoms of sulfur and one molecular weight of 3-pentadecadienyl phenol.

8. A composition of the class described comprising a major proportion of an aqueous dispersion of a polysulfide which is a polymer of the unit

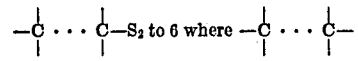

represents two carbon atoms joined to and separated by intervening structure, said dispersion containing from approximately 65% to approximately 80% solids, from approximately 0.25% to approximately 10% in relation to the solids content of said dispersion of mono aliphatic ammonium mono aliphatic dithiocarbamate serving as a coalescing agent, and from approximately 0.5 part to approximately 3.0 parts for each 100 parts of said aqueous dispersion of the heat reaction product of from approximately three to approximately eight gram atoms of sulfur and one molecular weight of 3-pentadecenyl phenol.

9. A composition of the class described comprising a major proportion of an aqueous dispersion of a polysulfide which is a polymer of the unit

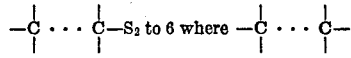

represents two carbon atoms joined to and separated by intervening structure, said dispersion containing from approximately 65% to approximately 80% solids, from approximately 0.25% to approximately 10% in relation to the solids content of said dispersion of mono aliphatic ammonium mono aliphatic dithiocarbamate serving as a coalescing agent, and from approximately 0.5 part to approximately 3.0 parts for each 100 parts of said aqueous dispersion of the heat reaction product of from approximately three to approximately six gram atoms of sulfur for each molecular weight of 2-vinyl-pyridine.

10. A composition of the class described comprising a major proportion of an aqueous dispersion of a polysulfide which is a polymer of the unit

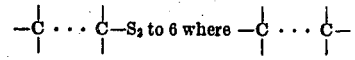

represents two carbon atoms joined to and separated by intervening structure, a small percentage of a mono alkenyl ammonium mono alkenyl dithiocarbamate serving as a coalescing agent, said dispersion containing from approximately 65% to approximately 80% solids, and from approximately 0.5 part to approximately 3.0 parts for each one hundred parts of said dispersion of the heat reaction product of from approximately four to approximately twelve gram atoms of sulfur and one molecular weight of 3-pentadecadienyl phenol.

11. A composition of the class described comprising a major proportion of an aqueous dispersion of a polysulfide which is a polymer of the unit represents two carbon atoms joined to and separated by intervening structure, a small percentage of a mono alkenyl ammonium mono alkenyl dithiocarbamate serving as a coalescing agent, said dispersion containing from approximately 65% to approximately 80% solids, and from approximately 0.5 part to approximately 3.0 parts for each one hundred parts of said dispersion of the heat reaction product of from about three to about eight gram atoms of sulfur and one molecular weight of distilled cashew nut shell liquid.

12. A sealing composition comprising approximately 33 parts of a concentrated aqueous dispersion of a copolymer of polyethyleneformal polysulfide and a polyolefin polysulfide, approximately 66 parts of a concentrated aqueous dispersion of a polyethyleneformal polysulfide, said dispersions each containing from approximately 65% to approximately 80% solids, approximately 0.90 part mono-allyl ammonium mono-allyl dithiocarbamate, approximately 1.50 parts of the heat reaction product of from approximately four to approximately twelve gram atoms of sulfur and one gram molecular weight of 3-pentadecadienyl phenol, and approximately 0.3 part vanadium pentoxide.

13. A sealing composition comprising approximately 33 parts of a concentrated aqueous dispersion of a copolymer of polyethyleneformal polysulfide and a polyolefin polysulfide, approximately 66 parts of a concentrated aqueous dispersion of a polyethyleneformal polysulfide, said dispersions each containing from approximately 65% to approximately 80% solids, approximately 0.90 part mono-allyl ammonium mono-allyl dithiocarbamate, and approximately 1.50 parts of the heat reaction product of from approximately three to approximately eight gram atoms of sulfur and one gram molecular weight distilled cashew nut shell liquid.

14. A sealing composition comprising approximately 33 parts of a concentrated aqueous dispersion of a copolymer of polyethyleneformal polysulfide and a polyolefin polysulfide, approximately 66 parts of a concentrated aqueous dispersion of a polyethyleneformal polysulfide, said dispersions each containing from approximately 65% to approximately 80% solids, approximately 1.10 parts mono-n-butylammonium mono-n-butyl dithiocarbamate, and approximately 1.5 parts of the heat reaction product of from approximately three to approximately eight gram atoms of sulfur and one gram molecular weight of an organic compound having alkenyl unsaturation and chosen from the group consisting of:

styrene
oleyl alcohol
2-vinyl alcohol
raw cashew nut shell distillation product comprising essentially 3-pentadecenyl phenol
raw cashew nut shell distillation product comprising essentially 3-pentadecadienyl phenol
raw linseed oil
maleic anhydride.

15. A sealing composition comprising approximately 33 parts of a concentrated aqueous dispersion of a copolymer of polyethyleneformal polysulfide and a polyolefin polysulfide, approximately 66 parts of a concentrated aqueous dispersion of a polyethyleneformal polysulfide, said dispersions each containing from approximately 65% to approximately 80% solids, approximately 1.10 parts mono-n-butylammonium mono-n-butyl dithiocarbamate, and approximately 1.5 parts of the heat reaction product of from approximately three to approximately six gram atoms of sulfur and approximately one molecular weight of 2-vinyl-pyridine.

16. A composition of the class described comprising a major proportion of an aqueous dispersion of a polysulfide which is a polymer of the unit

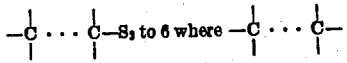

represents two carbon atoms joined to and separated by intervening structure, a small percentage of a mono alkenyl ammonium mono alkenyl dithiocarbamate serving as a coalescing agent, said dispersion containing from approximately 65% to approximately 80% solids, and from approximately 0.5 part to approximately 3.0 parts for each one hundred parts of said dispersion of the heat reaction product of from about four to about twelve gram atoms of sulfur for each molecular weight of 3-penta-decadienyl phenol.

17. A sealing composition comprising a major proportion of a polysulfide which is a polymer of the unit

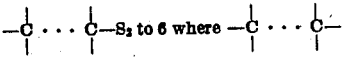

represents two carbon atoms joined to and separated by intervening structure, said dispersion containing from approximately 65% to approximately 80% solids, from approximately 0.25% to approximately 10% in relation to the solids content of said dispersion of a mono alkenyl ammonium mono alkenyl dithiocarbamate serving as a coalescing agent for said dispersion, and from approximately 0.5 to approximately 3.0 parts to each one hundred parts of said dispersion of the heat reaction product of from approximately four to approximately twelve gram atoms of sulfur and one gram atom of 3-pentadecadienyl phenol.

FREDERIC M. CARASSO.

REFERENCES CITED

The following references are of record in the file of this patent:

UNITED STATES PATENTS

| Number | Name | Date |
|---|---|---|
| 1,771,786 | Harvey | July 29, 1930 |
| 2,402,020 | Gislak | June 11, 1946 |